(12) United States Patent
Shaw

(10) Patent No.: US 9,919,240 B2
(45) Date of Patent: Mar. 20, 2018

(54) SYSTEMS AND METHODS FOR GREENHOUSE GAS REDUCTION AND CONDENSATE TREATMENT

(71) Applicant: Jimmy Don Shaw, Marlow, OK (US)

(72) Inventor: Jimmy Don Shaw, Marlow, OK (US)

(73) Assignee: Targa Pipeline Mid-Continent Holdings LLC, Tulsa, OK (US)

( * ) Notice: Subject to any disclaimer, the term of this patent is extended or adjusted under 35 U.S.C. 154(b) by 284 days.

(21) Appl. No.: 14/572,110

(22) Filed: Dec. 16, 2014

(65) Prior Publication Data

US 2015/0168052 A1  Jun. 18, 2015

Related U.S. Application Data

(60) Provisional application No. 61/917,537, filed on Dec. 18, 2013.

(51) Int. Cl.
| | |
|---|---|
| *E21B 36/00* | (2006.01) |
| *E21B 43/34* | (2006.01) |
| *F25J 3/06* | (2006.01) |
| *B01D 5/00* | (2006.01) |

(52) U.S. Cl.
CPC ......... *B01D 5/0036* (2013.01); *B01D 5/0039* (2013.01)

(58) Field of Classification Search
CPC ... F25J 3/0209; F25J 3/061; F25J 3/08; E21B 36/006; E21B 36/005; E21B 41/005; E21B 43/34

USPC .................................. 166/267, 57; 210/774
See application file for complete search history.

(56) References Cited

U.S. PATENT DOCUMENTS

| | | | | |
|---|---|---|---|---|
| 4,617,030 A | * | 10/1986 | Heath | ..................... E21B 43/34 95/158 |
| 9,353,315 B2 | * | 5/2016 | Heath | ...................... C10G 5/06 |
| 2013/0213085 A1 | * | 8/2013 | Ward | ......................... F25J 3/00 62/618 |

* cited by examiner

*Primary Examiner* — Kenneth L Thompson
(74) *Attorney, Agent, or Firm* — Jones Day

(57) ABSTRACT

Systems and methods are provided for controlling vapor recovery in a pressurized system. A first vessel is configured to receive gas or condensate from a station at a first pressure, the first vessel including a first output for outputting vapor to a liquid cooled compressor. A second vessel is configured to receive condensate from the first vessel, the second vessel being controlled to maintain a second pressure that is lower than the first pressure, the second vessel including a first output for outputting vapor to the first vessel, the second vessel including a second output for outputting condensate to a storage container. A second compressor is configured to maintain the second pressure at the second vessel, and a pumping network is configured to transport liquid from the compressor to the first vessel and the second vessel to increase temperatures at the first vessel and the second vessel.

21 Claims, 4 Drawing Sheets

SYSTEMS AND METHODS FOR GREENHOUSE GAS REDUCTION AND CONDENSATE TREATMENT

CROSS-REFERENCE TO RELATED APPLICATIONS

This application claims priority to U.S. Provisional Patent Application No. 61/917,537, entitled "Systems and Methods for Reduction of GHG and Recovering Lost Vapor," filed Dec. 18, 2013, the entirety of which is herein incorporated by reference.

FIELD

This disclosure is related generally to limitation of greenhouse gas emissions and more particularly to treatment of vapor and condensate from a gas well.

BACKGROUND

Gas and condensate extracted from a well, such as a natural gas well, include a variety of volatiles including light-weight volatiles (e.g., methane, ethane, propane, and butane) that are prone to boil off to atmosphere. For example, when stored in a storage tank (e.g., an API storage tank) at atmospheric pressure, such light-weight volatiles can be lost to atmosphere, resulting in a greenhouse gas emission and a loss of product that could otherwise be sold. Systems and methods as described herein can, in certain embodiments, provide a number of benefits including reduction of such emissions and improvement in a quality of product (e.g., gas, condensate) made available for transport, processing, sale, and use.

SUMMARY

Systems and methods are provided for controlling vapor recovery in a pressurized system. A first vessel is configured to receive gas or condensate from a station at a first pressure, the first vessel including a first output for outputting vapor to a liquid cooled compressor. A second vessel is configured to receive condensate from the first vessel, the second vessel being controlled to maintain a second pressure that is lower than the first pressure, the second vessel including a first output for outputting vapor to the first vessel, the second vessel including a second output for outputting condensate to a storage container. A second compressor is configured to maintain the second pressure at the second vessel, and a pumping network is configured to transport liquid from the compressor to the first vessel and the second vessel to increase temperatures at the first vessel and the second vessel.

As another example, a method of controlling vapor recovery in a pressurized system includes receiving gas or condensate from a station at a first vessel at a first pressure. Vapor from the first vessel is output to a liquid cooled compressor, and condensate from the first vessel is output to a second vessel. A second pressure at the second vessel is controlled, the second pressure being lower than the first pressure. Vapor from the second vessel is output to the first vessel. Condensate from the second vessel is output to a storage container. The first vessel and the second vessel are heated using liquid from the liquid cooled compressor.

DETAILED DESCRIPTION

Figure 1:
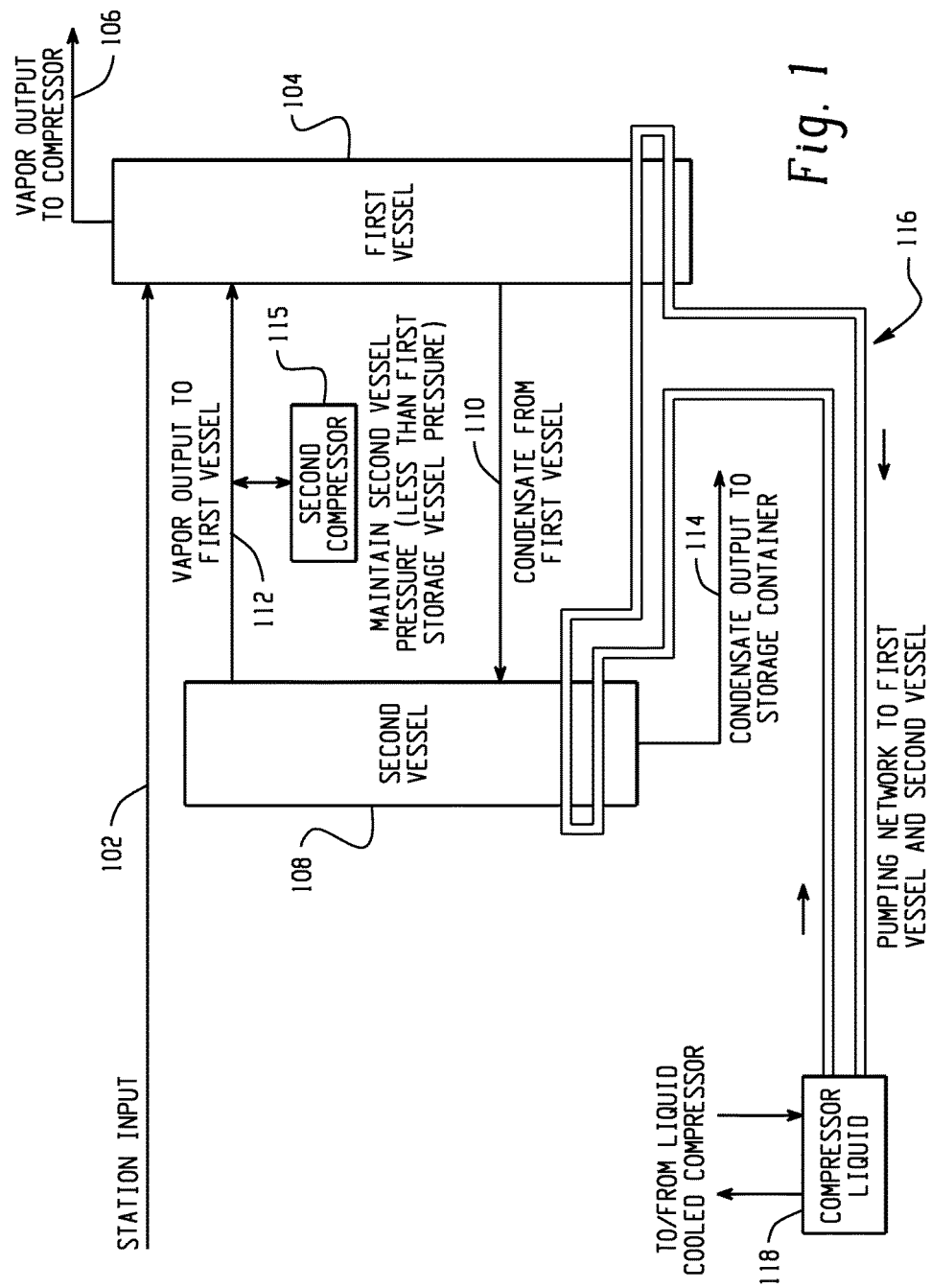
FIG. 1 is a diagram depicting a system for controlling vapor recovery in a pressurized system.

FIG. 1 is a diagram depicting a system for controlling vapor recovery in a pressurized system. The system of FIG. 1 is capable of providing one or more benefits including increased capture of light weight volatiles, reducing greenhouse gas emissions caused by escape of such volatiles to atmosphere, an increase in quality of condensate produced by the system, and a reduction in an ability for oxygen introduction (oxygen fouling) to end products, where such oxygen introduction results in a significant safety hazard. The example system, positioned at a booster station, receives gas and/or condensate at 102, such as from a station pump of a gas well. A first vessel 104 (e.g., a first separator) is configured to receive the gas and/or condensate from the station at a first pressure (e.g., 40-90 PSI). The first vessel 104 includes a first output at 106 for outputting vapor to one or more liquid cooled compressors (e.g., six). The vapor contains gas volatiles that include light weight volatiles (e.g., propane and butane). The liquid cooled compressor that receives the vapor output at 106 compresses that vapor to a transport-appropriate pressure (e.g., a pressure greater than 500 PSI, such as 800-900 PSI).

A second vessel 108 (e.g., a second separator) is configured to receive condensate from the first vessel via 110. The second vessel 108 is controlled to maintain a second pressure (e.g. a pressure that is less than 10 PSI) that is lower than the first pressure at the first vessel 104. The second vessel includes a first output at 112 for outputting vapor from the second vessel 108 to the first vessel 104. The second vessel 108 further includes a second output at 114 for outputting condensate to a storage container. A second compressor 115 is configured to maintain the second pressure at the second vessel 108. A pumping network 116 is configured to transport liquid 118 from the liquid cooled compressor to the first vessel 104 and the second vessel 108 to increase temperatures at the first vessel 104 and the second vessel 108. In one embodiment, the liquid is pumped to the second vessel 108 followed by the first vessel 104 and back to a reservoir 118 for use in cooling the compressor, as depicted in FIG. 1. In another embodiment, the liquid is pumped to the first vessel 104 followed by the second vessel 108, and in a further embodiment, the liquid is pumped independently to the first vessel 104 and the second vessel 108 via independent loops.

Figure 2:
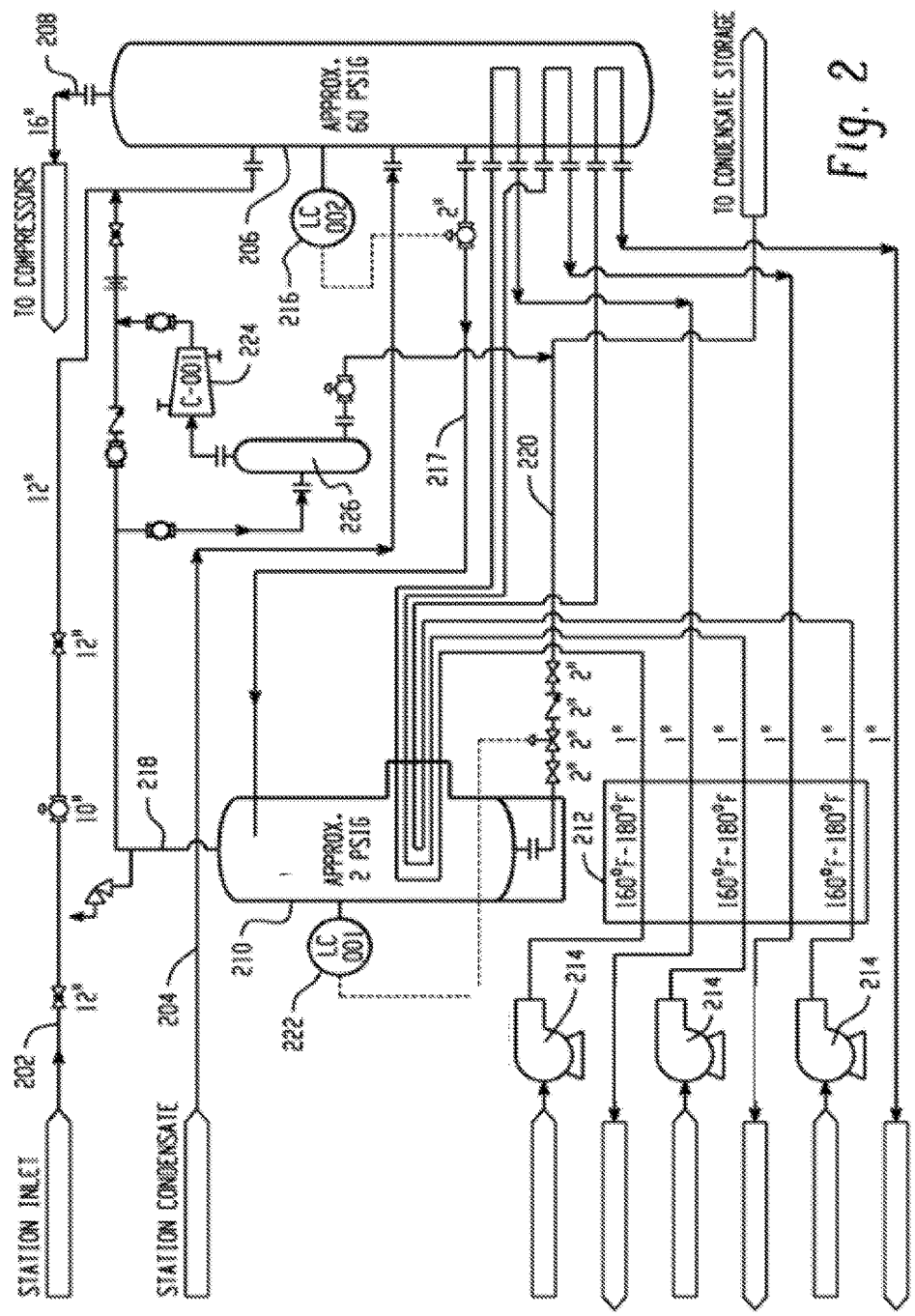
FIG. 2 is a diagram depicting a system for controlling vapor recovery in another embodiment of the disclosure.

FIG. 2 is a diagram depicting a system for controlling vapor recovery in another embodiment of the disclosure. A first inlet at 202 provides gas from a station to the system, such as saturated gas from a well head. A second inlet at 204 provides condensate (all or mostly liquid) from the station. The gas from 202 and condensate from 204 are provided to a first vessel 206 that operates at a first pressure that is greater than 10 PSI and is typically in the 50-90 PSI range. The first vessel 206 includes a first output at 208 for outputting vapor that includes gas volatiles to a liquid cooled compressor. The compressor compresses the vapor outputted at 208 from the first vessel pressure to a transport pressure that is often in the 800-900 PSI range.

Such compression often generates a large amount of heat (e.g., requiring a compressor in the 1300 HP range). To improve compressor performance and to prevent malfunctions, liquid (e.g., water) is used to cool the compressor (e.g., via a steady flow of liquid over or through the compressor). Such cooling of the compressor heats the liquid. In one embodiment of the disclosure, that heated water is used to increase the temperature of the first vessel 206 and a second vessel 210, described further herein, to increase volatile boil off for capture and compression via output 208. A pumping network, indicated in part at 212, transports heated liquid (e.g., ~180 DGF) from the compressor to the second vessel 210 and the first vessel 206, where a portion of the heat is released to those vessels 210, 206. The liquid then returns to the compressor, such as via one or more reservoirs, for recycling through the compressor for further cooling. In one embodiment, the pumping network 212 includes one or more pumps 214 (e.g., pumps connected to 3 of 6 liquid cooled compressors) that cycle the liquid through the pumping network 212 to the vessels 210, 206 for heat release and further to the compressor for heat acquisition. In one example, the pumps 214 continue to function even upon compressor malfunction or shutdown to reduce thermal shock to the compressor and mitigate damage to the compressor (e.g., head cracking). The use of heated compressor liquid to increase the temperature of the vessels 210, 206 saves energy over a system that would use another energy source to heat the vessels 210, 206.

Condensate accumulated in the first vessel 206 (e.g., condensate containing heavier hydrocarbons) is transported to the second vessel 210, such as under control of a level controlled valve 216 (e.g., a throttling float valve) that opens the path 217 from the first vessel 206 to the second vessel 210 when an amount of condensate in the first vessel 206 reaches a certain volume (height) in the first vessel 206. In one example, the second vessel 210 is smaller (e.g., 50% of or smaller) in size than the first vessel 206. The second vessel 210 is maintained at a second pressure that is lower than the first pressure of the first vessel 206. (e.g., less than 10 PSI, typically 1-5 PSI). Such a lower pressure in combination with heating of the second vessel 210 via liquid from the pumping network 212 encourages additional volatile boil off, with such vapor being output to the first vessel 206 via 218. To further encourage lightweight volatile vaporization, the second vessel 210 is configured to stand vertically such that a height of the second vessel 210 is greater than a width of the second vessel 210. Additionally, in one embodiment, one or more pall rings are positioned within the second vessel 210, where the condensate from the first vessel 206 is input to the second vessel 210 near the top of the second vessel 210 such that the condensate flows vertically down the sides of second vessel 210 and over the pall rings therein, increasing the surface area of the condensate and promoting additional vaporization. Condensate (e.g., condensate containing heavier hydrocarbons) that is not vaporized within the second vessel 210 is outputted to a condensate storage container, such as an API tank, via an output at 220. Release of the condensate in FIG. 2 is under the control of a second level control valve 222 that releases condensate from the second vessel 210 when that condensate reaches a certain level.

In one embodiment, the system seeks to control vaporization of the condensate in the second vessel 210 to condition the condensate that is outputted at 220 to meet one or more parameters. For example, condensate received at the second vessel 210 typically has a Reid Vapor Pressure (RVP) around 70 PSI. Condensate can be sold for processing and use. Because condensate having a high RVP value is more prone to volatile boil off (e.g., during transport), condensate purchasers may only be willing to pay a lesser price or impose a price penalty for condensate having a high RVP value. When condensate vaporizes, the RVP of the remaining condensate decreases. The second vessel 210 and its associated mechanisms for encouraging volatile vaporization (e.g., lower pressure, heating via pumping network, increased surface area for condensate traversal) lowers the RVP of the condensate output at 220 while capturing any lightweight volatiles that evaporate in the second vessel 210 via 218. Additionally, the quantity value of condensate decreases when its RVP falls too low (potentially resulting in a loss of value), meaning that complete condensate boil off is sometimes also sub-optimal. In one example, a target condensate RVP for outputting at 220 is in the range of 12-14 PSI, which is at least 15 PSI less than the RVP of the condensate provided to the second vessel 210 via 217.

In one embodiment, the system seeks to control the RVP of the condensate output at 220 via control of the second pressure in the second vessel 210 using a second compressor 224. The second compressor 224 typically seeks to maintain the second pressure in the 0.25-5 PSI range. In one example, that pressure is adjusted based on a temperature measured at the second vessel 210, where that second vessel 210 is heated by the pumping network 212. In one embodiment, the second pressure of the second vessel 210 is increased 1 PSI by the second compressor 224 for every increase of 10 DGF at the second vessel 210. In one embodiment, the second compressor includes a third vessel 226 for capturing any condensate formed in output line 218 (e.g., based on the increase in pressure from the second vessel 210 to the first vessel 206), with that condensate being output to the condensate storage vessel via 220.

In addition to potentially reducing greenhouse emissions and facilitating capture of more vapor and higher quality condensate, systems and methods as described herein can offer significant safety improvements over traditional systems. Traditional systems often attempt to recapture or simply burn off vapor at an unpressurized tank (e.g., an API tank). Such unpressurized tanks offer opportunities for oxygen introduction (fouling) which can produce a serious safety (e.g., explosion) hazard. Systems and methods as described herein can be maintained in a totally or significantly pressurized state to avoid opportunities for unwanted oxygen introduction during vapor recapture or disposal.

Figure 3:
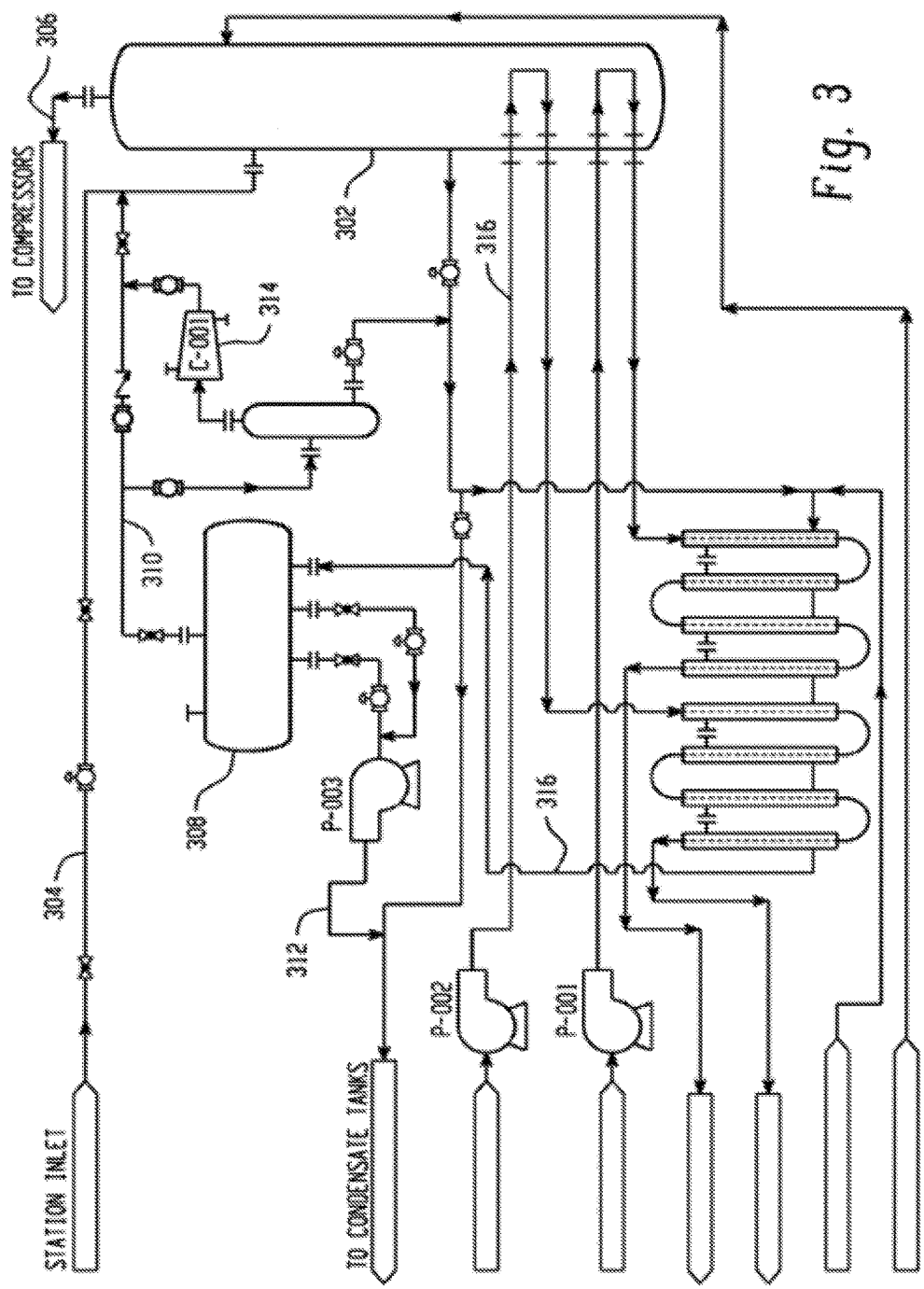
FIG. 3 is a diagram depicting an example system for controlling vapor recovery in a pressurized system.

FIG. 3 is a diagram depicting an example system for controlling vapor recovery in a pressurized system. The system includes a first vessel 302 that is configured to receive gas or condensate from a station at 304 at a first pressure, the first vessel 302 including an first output at 306 for outputting vapor to a liquid cooled compressor. A second vessel 308 is configured to receive condensate from the first vessel 302, the second vessel 308 being controlled to maintain a second pressure that is lower than the first pressure, the second vessel including a first output at 310 for outputting vapor to the first vessel 302, the second vessel including a second output at 312 for outputting condensate to a storage container. A second compressor 314 is configured to maintain the second pressure at the second vessel 308, and a pumping network 316 is configured to transport liquid from the compressor to the first vessel 302 and the second vessel 308 to increase temperatures at the first vessel 302 and the second vessel 308.

Figure 4:
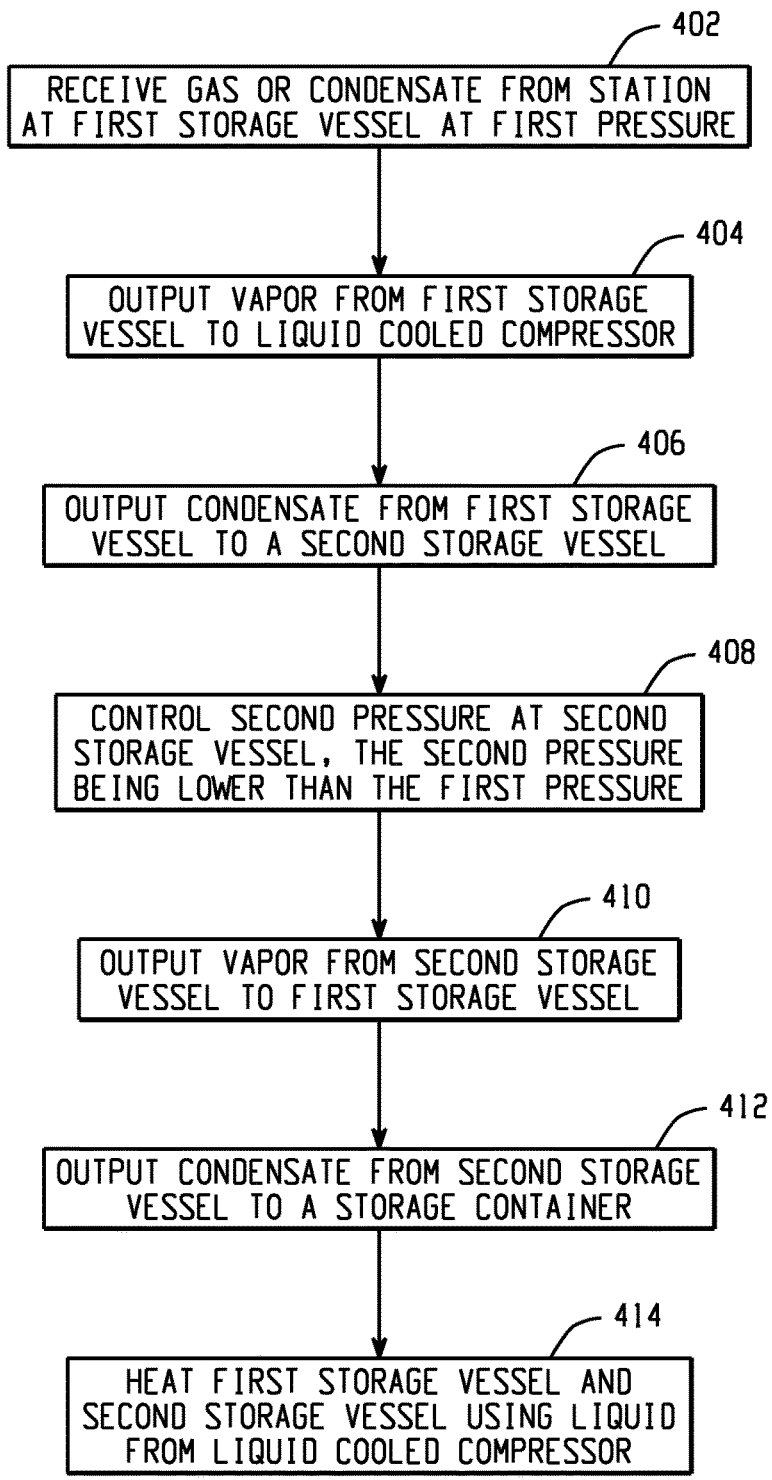
FIG. 4 is a flow diagram depicting a method of controlling vapor recovery in a pressurized system.

FIG. 4 is a flow diagram depicting a method of controlling vapor recovery in a pressurized system. At 402, gas or condensate is received from a station at a first vessel at a first pressure. At 404, vapor from the first vessel is output to a liquid cooled compressor, and at 406, condensate from the first vessel is output to a second vessel. At 408, a second pressure at the second vessel is controlled, the second pressure being lower than the first pressure. At 410, vapor from the second vessel is output to the first vessel. Condensate from the second vessel is output to a storage container at 412. At 414, the first vessel and the second vessel are heated using liquid from the liquid cooled compressor.

Examples have been used herein to describe exemplary aspects of the invention, but the scope of the invention should not be limited thereto.

It is claimed:

1. A system for controlling vapor recovery in a pressurized system, comprising:
    a first vessel configured to receive gas or condensate from a station at a first pressure, the first vessel including a first output for outputting vapor to a liquid cooled compressor;
    a second vessel configured to receive condensate from the first vessel, the second vessel being controlled to maintain a second pressure that is lower than the first pressure, the second vessel including a first output for outputting vapor to the first vessel, the second vessel including a second output for outputting condensate to a storage container;
    a second compressor configured to maintain the second pressure at the second vessel; and
    a pumping network configured to transport liquid from the liquid cooled compressor to the first vessel and the second vessel to increase temperatures at the first vessel and the second vessel.

2. The system of claim 1, wherein the liquid cooled compressor is configured to compress the vapor outputted from the first vessel to a transport pressure that is greater than the first pressure of the first vessel.

3. The system of claim 2, wherein the first pressure is between 40 and 90 PSI, and wherein the transport pressure is greater than 500 PSI.

4. The system of claim 1, wherein the second vessel comprises a condensate surface area increasing device, wherein the condensate received from the first vessel flows over the condensate surface area increasing device.

5. The system of claim 4, wherein the condensate surface increasing device comprises a Pall ring.

6. The system of claim 4, wherein the second vessel is configured to stand vertically such that a height of the second vessel is greater than a width of the second vessel, wherein the second vessel includes an input at a top portion for receiving the condensate from the first vessel, wherein the condensate surface increasing device is positioned between the input and a bottom portion of the second vessel, wherein the second output is positioned at the bottom portion of the second vessel.

7. The system of claim 6, wherein the piping network is configured to heat the bottom portion of the second vessel.

8. The system of claim 1, wherein the piping network provides liquid that is heated by the liquid cooled compressor to the second vessel followed by the first vessel, wherein the piping network further returns the liquid to the liquid cooled compressor.

9. The system of claim 1, wherein the second compressor is configured to adjust the second pressure at the second vessel based on a temperature at the second vessel.

10. The system of claim 1, wherein the second compressor is configured to increase the pressure at the second vessel X PSI based on an increase of Y in temperature at the second vessel.

11. The system of claim 1, wherein the first vessel receives both gas and condensate from the station as well s vapor from the second vessel.

12. The system of claim 1, wherein the first pressure is greater than 40 PSI, and wherein the second pressure is less than 10 PSI.

13. The system of claim 1, wherein the system is configured to output the condensate from the second vessel within a predetermined Reid Vapor Pressure range.

14. The system of claim 13, wherein the range includes 12-14 PSI.

15. The system of claim 1, wherein the first vessel is configured to receive gas or condensate from a natural gas well.

16. The system of claim 1, wherein the vapor output from the first vessel comprises methane, ethane, propane, or butane.

17. The system of claim 1, wherein the system is configured to operate in a pressurized state to prevent an oxygen inflow.

18. The system of claim 1, wherein the condensate output to the storage container has a Reid Vapor Pressure that is at least 15 PSI less than the Reid Vapor Pressure of condensate present in the first vessel.

19. The system of claim 1, further comprising one or more pumps configured to pump the liquid from the compressor to the first vessel and the second vessel.

20. The system of claim 19, wherein the one or more pumps are configured to continue pumping the liquid after a failure of the liquid cooled compressor.

21. The system of claim 1, wherein the first vessel and the second vessel are separators.

* * * * *